INVENTOR.
W. V. CHILDS

Aug. 12, 1969   W. V. CHILDS   3,461,049
ELECTROCHEMICAL PRODUCTION OF OXYGEN DIFLUORIDE
Filed Nov. 2, 1967   2 Sheets-Sheet 2

INVENTOR.
W. V. CHILDS
BY
*Young and Quigg*
ATTORNEYS

United States Patent Office 3,461,049
Patented Aug. 12, 1969

3,461,049
ELECTROCHEMICAL PRODUCTION OF OXYGEN DIFLUORIDE
William V. Childs, Bartlesville, Okla., assignor to Phillips Petroleum Company, a corporation of Delaware
Continuation-in-part of application Ser. No. 435,255, Feb. 25, 1965. This application Nov. 2, 1967, Ser. No. 683,088
Int. Cl. B01k 1/00
U.S. Cl. 204—59                              10 Claims

ABSTRACT OF THE DISCLOSURE

Oxygen difluoride is produced electrochemically by introducing an oxygen-containing gas into the pores of a porous anode in an electrolysis cell containing an essentially anhydrous liquid hydrogen fluoride electrolyte. Oxygen difluoride product is recovered from an effluent stream from said cell.

---

This application is a continuation-in-part of my copending application Ser. No. 435,255, filed Feb. 25, 1965, now abandoned.

This invention relates to the production of oxygen difluoride. In one aspect this invention relates to a process for preparing oxygen difluoride by electrochemical fluorination of oxygen.

Oxygen difluoride is a strong oxidizing agent, being only slightly less vigorous than elemental fluorine. Thus, it has utility in chemical conversion processes as well as a component in rocket fuel systems. Oxygen difluoride is also useful as a polymerizing agent in the polymerization of fluoriated olefins. Recently it has been proposed to use oxygen difluoride as the gas filler charge in photoflash bulbs instead of the usual oxygen charge.

Oxygen difluoride is generally prepared by the action of elemental fluorine on sodium hydroxide to produce oxygen difluoride as well as sodium fluoride by-product. Such a process has disadvantages in that it requires the difficult and inconvenient handling of fluorine in the elemental state, and it produces a fluorine-containing by-product, sodium fluoride, which must be recovered and regenerated to elemental fluorine for best efficiency.

I have now discovered that oxygen difluoride can be prepared electrochemically from oxygen in an electrolytic cell reaction characterized by mild operating conditions, the use of relatively inexpensive reagents, and by the production of oxygen difluoride as essentially the sole product to the exclusion of any significant quantity of by-products other than a stream of essentially pure hydrogen. The process of my invention is a direct process, it can be carried out continuously, and it does not require extensive recycling or reworking of intermediate reagents or by-products.

Broadly speaking, the process of the invention comprises electrolyzing a current-conducting essentially anhydrous liquid hydrogen fluoride electrolyte in an electrolysis cell provided with a cathode and a porous anode, introducing an oxygen-containing gas into the pores of said anode, and recovering oxygen difluoride product from said cell.

An object of this invention is to provide an electrochemical process for the production of oxygen difluoride. Another object of this invention is to provide an electrochemical process for the production of oxygen difluoride in good yields and with good selectivity. Another object of this invention is to an improved electrochemical process for the production of oxygen difluoride which is economical, commercially feasible, provides for the utilization of ordinary air from the atmosphere as a preferred starting material, and is accompanied by the minimum formation of undesirable by-products. Other aspects, objects, and advantages of the invention will be apparent to those skilled in the art in view of this disclosure.

Thus, according to the invention, there is provided a process for the electrochemical production of oxygen difluoride, which process comprises: passing an electric current through a current-conducting essentially anhydrous liquid hydrogen fluoride electrolyte contained in an electrolysis cell provided with a cathode and a porous anode; passing an oxygen-containing gas into the pores of said anode; and recovering oxygen difluoride as product of the process.

The oxygen utilized in the practice of the ivnention can be obtained from any suitable source. Ordinary atmospheric air is a presciently preferred source of oxygen because it is readily available in inexhaustible supply, and ordinarily needs nop urification or other pretreatment other than slight compression to a few pounds above at mospheric for convenience in handling. Thus, ordinary air can be compressed and passed into the porces of the porous anode in any suitable manner as described herein. If desired, pure oxygen or substantially pure oxygen diluted with an inert gaseous diluent such as heilum, argon, neon, xenon, kryton, nitrogen, carbon dioxide, or a perfluorocarbon, can be utilized as the source of oxygen used in the practice of the invention. Perfluorocarbons containing from 1 to 8 carbon atoms per molecule can be utilized in the practice of the invention. It will be understood that said perfluorocarbons will be utilized in the gaseous state. Examples of said perfluorocarbons which can be utilized in the practice of the invention include, among others: tetrafluoromethane; hexafluoroethane; perfluoropropane; the perfluorobutanes; the perfluorohexanes; the perfluorohexanes; and the perfluorooctanes. The perfluorocarbons containing from 1 to 4 carbon atoms per molecule are preferred. Air, of course, can for all practical purposes, be considered as a stream of oxygen diluted with nitrogen. Thus, any suitable stream of oxygen-containing gas can be used as feedstock material in the practice of the invention. When a stream of gas other than essentially pure oxygen is used as said feedstock, it is preferred for practical economical reasons that said gas stream contain at least 5 volume per cent of oxygen.

As used herein and in the claims, unless otherwise specified, the term "inert", when employed in connection with the above-described diluents, refers to and includes any gas which is nonreactive under the cell operating or reaction conditions.

The electrochemical process of the invention is carried out in a medium of hydrogen fluoride electrolyte. Although said hydrogen fluoride electrolyte can contain small amounts of water, such as up to about 5 weight per cent, it is preferred that said electrolyte be essentially anhydrous. Generally speaking, it is preferred that said electrolyte contain not more than about 0.1 weight percent water. However, commercial anhydrous liqiud hydrogen fluoride which normally contains dissolved water in amounts ranging from a trace (less than 0.1 weight percent) up to about 1 percent by weight can be used in the practice of the invention. Thus, as used herein and in the claims, the term "essentially anhydrous liquid hydrogen fluoride," unless otherwise specified, includes liquid hydrogen fluoride which can contain water not exceeding up to about 1 weight percent. As the electrolysis reaction proceeds, any water contained in the hydrogen fluoride electrolyte is slowly decomposed and said electrolyte concomitantly approaches the anhydrous state. In the practice of the invention, when using a specially prepared feed mixture such as oxygen diluted with helium, one preferred method of operation when starting a cell with a new electrolyte which contains traces of water is to electrolyze said electrolyte for a few hours while using an inexpensive feed mixture such as air, prior to introducing said specially prepared feed mixture, so as to remove said water. The hydrogen fluoride electrolyte is consumed in the reaction and must either continuously or intermittently placed in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulphuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas KF·2HF, KF·3HF, or KF·4HF. Such electrolytes can be conveniently prepared by adding the required quantity of hydrogen fluoride to KF·HF (potassium bifluoride). In general, said additives are not consumed in the process and can be used indefinitely. Said additives are frequently referred to as conductivity additives for convenience.

The cell body and the electrodes in the cell must be fabricated of materials which are resistant to the action of the contents of the cell under the reaction conditions. Materials such as steel, iron, nickel, polytetrafluoroethylene (Teflon), carbon, and the like, can be employed for the cell body. The cathode can be fabricated in any suitable shape or design and can be made of any suitable conducting material such as iron, steel, nickel, alloys of said metals, and carbon. The anode must comprise a porous element. Said anode can be fabricated from any suitable conducting material which is compatible with the system, e.g., nickel, iron, various metal alloys, and carbon. The anode must comprise a porous element. Said anode can be fabricated from any suitable conducting material which is compatible with the system, e.g., nickel, iron, various metal alloys, and carbon, which is not wetted by the electrolyte. By "not wetted" is meant that the contact angle between the electrolyte and the anode must exceed 90° in order that anticapillary forces will prevent substantial invasion of the small pores of the anode by the electrolyte. Porous carbon, which is economical and readily available in ordinary channels of commerce, is presently preferred for the porous element of said anode. Porous carbon impregnated with a suitable metal such as nickel can also be used as the anode. Various grades of porous carbon can be used in the practice of the invention. It is preferred to employ porous carbon which has been made from carbon produced by pyrolysis, and not graphitic carbon. Two types of commercially available porous carbon are those known commercially as Stackpole 139 and National Carbon Grade 60. Said Stackpole 139 carbon has a pore volume of about 0.2 to about 0.3 cc. per gram with the pore diameters ranging from 0.1 to 10 microns in diameter. Said National Carbon Grade 60 has a pore volume of about 0.3 to about 0.5 cc. per gram with the pore diameters ranging from 10 to 60 microns in diameter. The actual values of said pore volumes will depend upon the specific method employed for determining same. Thus, preferred porous carbons for fabricating anodes employed in the practice of the invention include those having a pore volume within the range of about 0.2 to about 0.5 cc. per gram with the pores ranging from 0.1 to 60 microns in diameter.

When the porous element of said anode is porous carbon, said anode can, if desired, comprise another conducting element which is in contact with said porous carbon element. Said other conducting element can be fabricated from any suitable conducting material which is compatible with the system, e.g., nickel, iron, cobalt, steel (including the various carbon steels and the various stainless steels), and alloys of nickel with other metals which contain at least 5 weight percent nickel. Included among said alloys of nickel are: alloys of nickel with titanium; alloys of nickel with copper, such as Monel; the various Hastelloys; the various Inconel alloys; and the various Chlorimet alloys. Some of said metals and alloys are more compatible with the system than others are, but all are operable within the scope of the invention. The presently most preferred metals for utilization as said other conducting element are essentially pure nickel, e.g., the various commercially available grades of nickel metal, and the high nickel alloys, e.g., those alloys of nickel containing at least 50 weight percent nickel.

Said anode or said combination anode of porous carbon and another conducting element can be fabricated in any suitable shape or design, but must be arranged or provided with a suitable means for introducing the feed reactant material into the pores of the porous element thereof.

Except for the limitations described above, any convenient cell configuration or electrode arrangement can be employed. The cell must be provided with a vent or vents through which by-product hydrogen can escape and through which volatile cell products can be removed and recovered. If desired or necessary, a drain can be provided on the bottom of the cell. The cell preferably should contain an ion permeable membrane or divider for dividing the cell into an anode compartment and a cathode compartment. It is desirable to employ such a divider to prevent hydrogen generated at the cathode from mixing and reacting with the oxygen difluoride product produced at the anode. Any conventionally known resistant divider material can be employed for this purpose. When the anode products are withdrawn from the cell through a conduit means directly connected to the anode, as described further hereinafter, said divider can be omitted.

The electrochemical conversion of oxygen to oxygen difluoride can be effectively and conveniently carried out over a broad range of temperatures and pressures limited only by the freezing point and the vapor pressure of the electrolyte. Generally speaking, the process of the invention can be carried out at temperatures within the range of from minus 80 to 500° C. at which the vapor pressure of the electrolyte is not excessive, e.g., less than 250 mm. Hg. It is preferred to operate at temperatures such that the vapor pressure of the electrolyte is less than about 50 mm. Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60 to about 105° C.

Pressures substantially above or below atmospheric can be employed if desired, depending upon the vapor pressure of the electrolyte as discussed above. In all instances, the cell pressure will be sufficient to maintain a liquid phase of electrolyte. Generally speaking, the process of the invention is conveniently carried out at substantially atmospheric pressure. It should be pointed out that a valuable feature or advantage of the invention is that the operating conditions of temperature and pressure within the limitations discussed above are not critical and are essentially independent of the fact that a gaseous feed is used in the process. Thus, the solubility of the oxygen, and/or other gas components of the feed, in the electrolyte medium is not critical. Vigorous agitation or the use of chemical solubilizers, such as required in some prior art processes, are not necessary. In some instances, however, a mild stirring or agitation for purposes of aiding in temperature control is beneficial. It should be noted that in the preferred manner of practicing the invention the porous anode is not merely a sparger for introducing the feedstock into the electrolyte as in some electrolytic processes of the prior art. In the preferred manner of practicing the invention, the fluorination is carried out within the pores of the anode and contact between the main body of electrolyte and the feedstock and/or fluorinated product is avoided.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that said anode is not corroded or disintegrated under the given current flow. Current densities within the range of from 30 to 1000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In normal operation, free or elemental fluorine will not be evolved. Voltages in the range of from 4 to 12 volts are typical. The maximum voltage will not exceed 20 volts per unit cell in normal operation. Thus, as a guide in practicing the invention, voltages in the range of 4 to 20 volts per unit cell can be used.

As used herein and in the claims, unless otherwise specified, the term "anode geometric surface" refers to the outer geometric surface area of the anode which is exposed to electrolyte and does not include the pore surfaces. For example, in the drawing (FIGURE 1) the anode geometric surface is the outer vertical cylindrical side wall.

The feed rate of oxygen (either as essentially pure oxygen or as oxygen contained in a feed mixture as described herein) being introduced into the pores of the anode is an important process variable in that, for a given current flow or current density, said feed rate controls the degree of conversion. Similarly, for a given rate, the amount of current flow or current density can be employed to control the degree of conversion. Feed rates which can be employed in the practice of the invention will usually be within the range of 0.002 to 0.3, preferably in the range of from 0.01 to 0.1, moles of oxygen per hour per square centimeter of anode geometric surface area. With the higher feed rates, higher current density and current rates are employed. Generally speaking, said oxygen feed rate and the current flow will be so correlated as to use from 0.2 to 4, preferably from 0.5 to 2, Faradays per mole of said oxygen feed. In the practice of the invention a porous anode is chosen which will be capable of operating at high current densities and thus suitable for passing the required quantity of feed material through the pores thereof at a rate which will utilize its porosity to maximum advantage. Since the anode can have a wide variety of geometrical shapes, which will affect the geometrical surface area, a sometimes more useful way of expressing the feed rate is in terms of anode cross-sectional area (taken perpendicular to the direction of flow of the feedstock within the pores of the anode). For the anode employed in Example I and illustrated in FIGURE 1, the above ranges would be 38 to 5700, preferably 190 to 1900 milliliters, per minute per square centimeter of cross-sectional area, calculated as gaseous volume at standard conditions.

The actual feed rate employed will depend upon the type of carbon used in fabricating the porous anode as well as several other factors including the nature of the feedstock, the conversion desired, current density, etc., because all these factors are interrelated and a change in one will affect the others. In the preferred method of practicing the invention, the feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unrelated feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these preferred flow rate conditions there is established a pressure balance between the feedstock entering the pores of the anode from one direction and electrolyte attempting to enter the pores from another and opposing direction. This pressure balance provides an important and distinguishing feature in that essentially none of the feed leaves the anode to form bubbles which escape into the main body of the electrolyte. Essentially all of the feedstock travels within the carbon anode via the pores therein until it reaches a collection zone within the anode from which it is removed via a conduit, or until it exits from the anode, preferably at a point above the surface of the electrolyte.

The more permeable carbons will permit higher flow rates than the less permeable carbons. Any suitable porous carbon which will permit operation within the limits of the above-described pressure balance can be employed in the practice of the above-described preferred method of the invention. Thus, broadly speaking, porous carbons having a permeability within the range of from 0.5 to 75 darcys and average pore diameters within the range of from 1 to 150 microns can be employed in practicing said preferred method of the invention. Generally speaking, carbons having a permeability within the range of from about 2 to about 30 darcys and an average pore diameter within the range of from about 20 to about 75 microns are preferred. It is also within the scope of the invention to employ other porous carbons in practicing other less preferred methods of the invention, as described elsewhere herein.

Similarly, anode shapes, anode dimensions, and manner of disposal of the anode in the electrolyte will also have a bearing on the flow rate. Thus, owing to the many different types of carbon which can be employed and the almost infinite number of combinations of anode shapes, dimensions, and methods of disposal of the anode in the electrolyte, there are no really fixed numerical limits on the flow rates which can be used in the practice of the invention. Broadly speaking, in the above-described preferred method of the invention, the upper limit on the flow rate will be that at which "breakout" of feedstock and/or fluorinated product begins in a region other than within the top portion of the anode when operating with a totally immersed anode similarly as in FIGURE 1, or along the immersed portion of the anode when the anode is provided with an internal collection zone as in FIGURE 2 or the top of the anode is above the surface of the electrolyte as in FIGURE 3. Herein and in the claims, unless otherwise specified, "breakout" is defined as the formation of bubbles of feedstock and/or fluorinated product on the outer immersed surface of the anode with subsequent detachment of said bubbles wherein they pass into the main body of the electrolyte. Broadly speaking, the lower limit of the feed rate in said preferred method of the invention will be determined by the requirement to supply the minimum amount of feedstock sufficient to prevent evolution of free fluorine. As a practical guide to those skilled in the art who desire to practice said preferred method of the invention, the flow rates can be within the range of from 3 to 600, preferably 12 to 240, cc. per minute per square centimeter of cross-sectional area (taken perpendicular to the direction of flow), calculated as gaseous volume at standard conditions.

The above-described pressure balance will permit some invasion of the pores of the anode by the hydrogen fluoride electrolyte. The amount of said invasion will depend upon the inlet pressure of the feedstock and the pore size. The larger size pores are more readily invaded. It has been found that porous carbon anodes as described herein can be successfully operated when up to 40 to 50 percent of the pores have been invaded by liquid HF electrolyte.

It will be understood that the invention is not limited to the above-described preferred method of operation. It is within the scope of the invention to operate at flow rates which are great enough to cause substantial breakout of the feedstock and/or fluorinated product from within the pores of the anode into the main body of the electrolyte.

An important feature of the invention is that the residence time of the feed materials in the cell is uniform and very low. While the actual residence time of the feed and fluorinated product in the reaction zone of the cell is difficult to determine, it appears the maximum residence time is in the order of 0.01 to 2 minutes, probably less than 1 minute. In the preferred method of the invention, the residence time within the pores of the porous element of the anode will be in the range of 0.25 to 0.5 minute. The actual residence time will depend upon the amount of invasion of the anode pores by the electrolyte. This is in marked contrast to the prior art fluorination processes wherein the feed material is dissolved in the electrolyte and the resulting solution then electrolyzed over a period of hours.

The volatile oxygen difluoride and the unconverted feed material are vented from the cell and then are subjected to conventional separation techniques such as fractionation, solvent extraction, adsorption, and the like, for separation of unconverted feed materials and reaction product. Unconverted oxygen, together with any diluent therefor which may have been used, can be recycled to the cell for the production of more product, if desired. By-product hydrogen can be burned to provide heat energy or can be utilized by hydrogen-consuming processes such as hydrogenation, etc.

It will be noted that in the process of the invention the oxygen or oxygen-containing gas is introduced into the cell in the gaseous phase. Furthermore, in the preferred manner of carrying out the invention, this introduction is made into the pores of a porous anode and the fluorination of oxygen is carried out within said pores. While it is not intended to limit the invention by any theory as to its reaction mechanism, it is presently believed that fluorine-containing anion from the HF electrolyte migrates into the porous anode where it discharges an electron and forms a free radical intermediate. It is believed this free radical adsorbs to the surface of the anode pores forming a surface complex which is the actual fluorinating species capable of fluorinating said oxygen. It has been established that free or elemental fluorine is not the fluorinating species. This is shown by the fact that in the normal operation of the process of the invention no free or elemental fluorine can be detected in the cell or in the reaction products.

Such a system wherein the fluorination takes place within the pores of the anode differs markedly from the systems of the prior art wherein (a) the reactant to be fluorinated is dissolved or emulsified to some extent in the electrolyte, or (b) said reactant is fed through a porous or perforated sparger into the electrolyte. In such prior art systems fluorination occurs in the electrolyte and the solubility of the reactant, usually very low or of only limited solubility at best, has a marked effect upon the reaction and limits the maximum rate of exhaustion or utilization of the fluorinating species, and thus limits the amount of current density which can be employed in the process. This limit is not present in the preferred manner of practicing the present invention because the reactant feedstock is continually transported to the fluorinating species within the pores of the anode and solubility of the feedstock in the electrolyte is not a controlling factor. This makes possible the utilization of much higher current densities with a resultant great increase in overall efficiency of the process.

An outstanding advantage of the process of the invention is the comparative freedom of the process from polarization difficulties as compared to prior art processes utilizing hydrogen fluoride electrolytes. This contributes to and makes possible the above-described great increase in overall efficiency of the invention process. Polarization is sometimes referred to as the anodic effect. When polarization occurs the ohmic resistance of the cell increases markedly. In severe cases the cell for all practical purposes becomes nonconductive and inoperable. Polarization is aggravated by more than trace amounts of water in the hydrogen fluoride electrolyte. When polarization does occur, infrequently, in the operation of the process, it has been found the cell can be restored to operation by applying high voltage (about 80 volts) thereto for a short period of time, usually about 2 to 10 minutes. Another way of overcoming polarization is to reverse the current for a short period of time.

In prior art processes utilizing hydrogen fluoride electrolytes and which depend upon the solubility of the reactant feed material in the electrolyte, the maximum amount of current density which can be employed without excessive anode corosion occurring is in the order of 20 milliamps per square centimeter of anode surface. In contrast, in the process of this invention the preferred minimum current density is 50 milliamps per square centimeter of anode surface.

Figure 1:
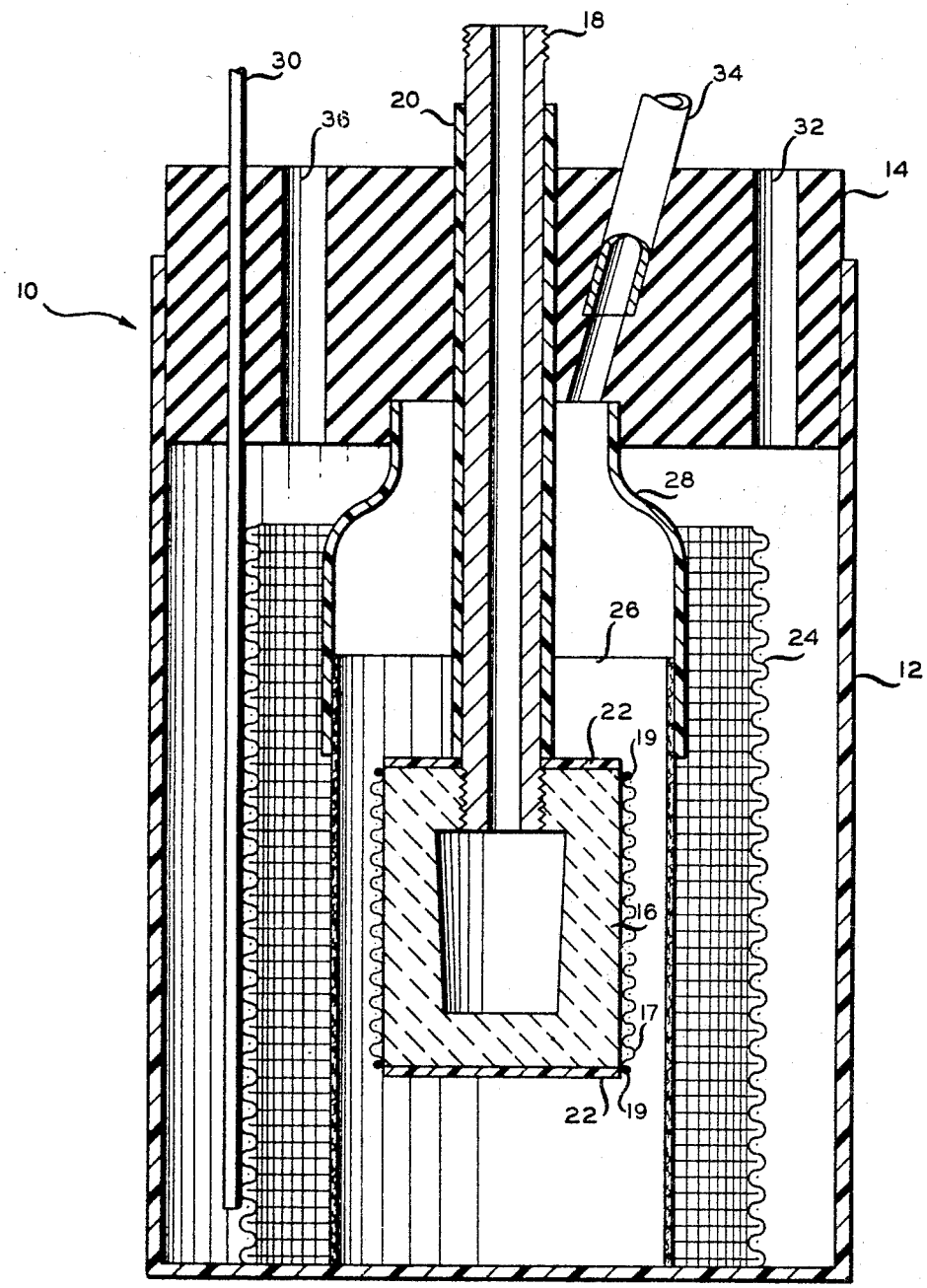
FIGURE 1 is a view in cross section illustrating one form of electrolysis cell which can be employed in the practice of the invention.

Referring now to FIGURE 1, the invention will be more fully explained. In said drawing, there is illustrated an electrolysis cell designated generally by the reference numeral 10. Said cell comprises a generally cylindrical container 12 which is closed at the bottom and open at the top. Said container can be fabricated from any suitable material which is resistant to the electrolyte employed therein. A removable top closure member 14 is adapted to cooperatively engage the upper portion of said container and close same. As here shown, said closure member comprises a rubber stopper which has been inserted into the upper portion of the container. It will be understood that any other suitable type of closure member which engages the upper edges or upper portion of the container, e.g., a threaded closure member can be employed. A first opening is centrally disposed in and extends through said closure member, as shown. While said opening is here shown as being centrally disposed for convenience, it will be understood it is not essential that said opening be centrally disposed. A first conduit 18, conveniently fabricated from stainless steel, mild steel, or other conductive material, extends through said first opening into the interior of said container 12. A suitable insulation 20, such as Teflon tape, is disposed around the outer wall of said first conduit and between same and the wall of said first opening. An anode 16 comprising a hollow cylinder or tube 16 of porous carbon, closed at one end thereof, is connected at the other end to the end of said conduit 18 which extends into said container. Preferably, the top and bottom surfaces of said carbon cylinder are sealed with a suitable plastic or other resistant cement 22.

In the cell illustrated, said cylinder or tube 16 has an outside diameter of about one inch. The remainder of the elements of said cell are, in general, proportional in size. These dimensions are given by way of example only and are not limiting on the invention. Any suitable type of porous carbon from among the several grades commercially available, as described above, can be employed for fabricating the carbon cylinder or tube 16.

If desired, a combination anode comprising said cylinder or tube 16 of porous carbon and another conducting element in contact therewith can be employed in the practice of the invention. As shown in the drawing, said combination anode comprises a metal member 17, here shown to be in the form of a metal screen or gauze wrapped around the outer or downstream side of said cylinder 16 in one or more layers. Said screen or gauze can be made from any of the metals described above, e.g., nickel, high nickel alloy, etc., and can be within the range of 10 to 200, preferably 50 to 150, mesh (U.S. Standard). While a screen or gauze is the presently preferred structure for said metal member, it is within the scope of the invention to employ other structures, e.g., a plurality of metal strips, perforated metal foil, etc.

Said metal member or screen 17 is held in place by tie members 19 which are wrapped around the outside of the screen and hold same tightly in contact with said cylinder 16. Although only two tie members 19 are shown at the top and bottom of the anode, it is within the scope of the invention to employ additional tie members intermediate the ends of said anode. Said tie members 19 can be fabricated from any suitable material such as Teflon (polytetrafluoroethylene) or metal wire of the same composition as said screen 17. It is within the scope of the invention to employ other means for fastening the metal member or screen to carbon cylinder 16. Such other means can comprise any suitable frame, clamp, etc., depending upon the general shape of the anode.

As shown, a recess is provided in the bottom wall of said closure member 14 and surrounds said first opening in said bottom wall. A substantially cylindrical diaphragm or divider holder 28 is positioned with the upper end thereof mounted in said recess and the lower end thereof extending downwardly around said first conduit 18. A substantially cylindrical divider or diaphragm 26 is positioned with its upper end mounted in said holder 28 and its lower end extending downwardly around the anode. Said diaphragm or divider can be fabricated from any suitable ion permeable material. As here shown, said diaphragm has been fabricated from an acid-washed filter paper. Other diaphragm materials which can be employed include grids or screens made of various metals such as nickel or nickel alloys, etc. The use of a diaphragm such as diaphragm 26 is essential when practicing the invention in a cell and employing an anode of the type illustrated in FIGURE 1 in that said diaphragm divides the interior of the container or cell into an anode compartment and a cathode compartment. The division of said container or cell into said compartments separates the anode product oxygen difluoride from the hydrogen produced at the cathode. Otherwise said oxygen difluoride and hydrogen would react. While said diaphragm is shown as extending to the bottom of said container 12, it will be understood there is no connection therebetween and liquid electrolyte is free to flow between said compartments. Also, while not shown, it will be understood that the bottom or bottom portion of said container can be provided with an outlet conduit.

A second opening 34 is provided in and extends through said closure member 14 into communication with said anode compartment. This opening provides means for withdrawing anode product from the cell. As shown, a conduit has been inserted into said opening. It will be understood that any suitable type of conduit means for withdrawing said anode product can be employed. A tubular thermocouple well 30 extends through said closure member 14 into said cathode compartment. A substantially cylindrical cathode 24, here shown to be fabricated from a metallic mesh or screen, is disposed in said cathode compartment around said diaphragm 26 and is maintained in position by being attached to said thermocouple well 30 (as by silver soldering). Said thermocouple well 30 thus also serves as the means for supporting and for connecting said cathode to a suitable source of direct current. A third opening 36 extends through said closure member 14 into communication with said cathode compartment. Said third opening provides conduit means for removing hydrogen produced at the cathode from the cell. It will be understood that any suitable type of conduit means can be inserted into said opening 36. A fourth opening 32 extends through said closure member 14 into communication with said cathode compartment and comprises conduit means for introducing electrolyte into the cell. It will be understood that any suitable type of conduit means can be inserted in said opening 32.

In the preferred manner of operating the cell illustrated in FIGURE 1, said cell is first charged with a suitable electrolyte such as essentially anhydrous liquid hydrogen fluoride and potassium fluoride in a mole ratio of KF·2HF. In the event said electrolyte contains traces of water, it is preferred to first electrolyze the electrolyte by connecting said first conduit 18 and said thermocouple well 30 to a suitable source of direct current and passing said current through the cell (while passing air into the anode as described above) for a period of time sufficient to remove essentially all of the water. A feed stream, either essentially pure oxygen or a feed mixture of oxygen and a diluent as described above, is then passed through conduit 18 into the interior of anode 16, and then passed into the pores of said anode and into contact with the fluorinating species therein. Fluorination of said oxygen occurs within the pores of said anode. As shown by examples given hereinafter, the unreacted feedstock and fluorinated product move upward through the connecting pores of the anode and exit from said anode closely adjacent the top thereof where the hydrostatic pressure of the electrolyte is least. The fluorinated product, oxygen difluoride, enters the space above the electrolyte and is withdrawn from the anode compartment via the conduit inserted into opening 34. Hydrogen is withdrawn from the cathode compartment via opening 36. The effluents from the cell will contain some HF, depending upon the temperature at which the cell is operated, and this HF can be removed from said effluents by scrubbing with a suitable scrubbing agent such as Ascarite (sodium hydroxide supported on asbestos), or if recovery of the HF is desired the scrubbing agent can be sodium fluoride or potassium fluoride. If desired, said HF can be separated from the cell effluents by fractional distillation. Temperature control of the cell contents is maintained by placing the cell in an oil bath provided with heat exchange means.

Figure 2:
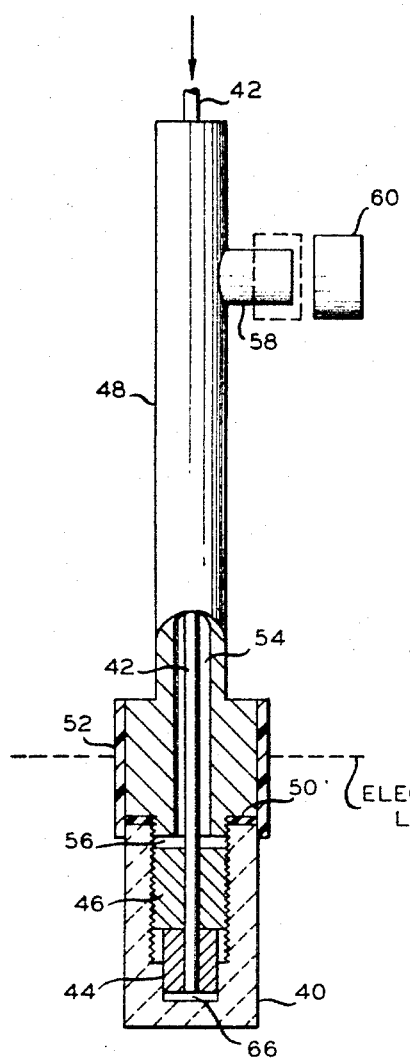
FIGURE 2 is a view in cross section illustrating one form of anode assembly which can be employed in the practice of the invention.

The anode assembly illustrated in FIGURE 2 is described hereinafter in Example II.

Figure 3:
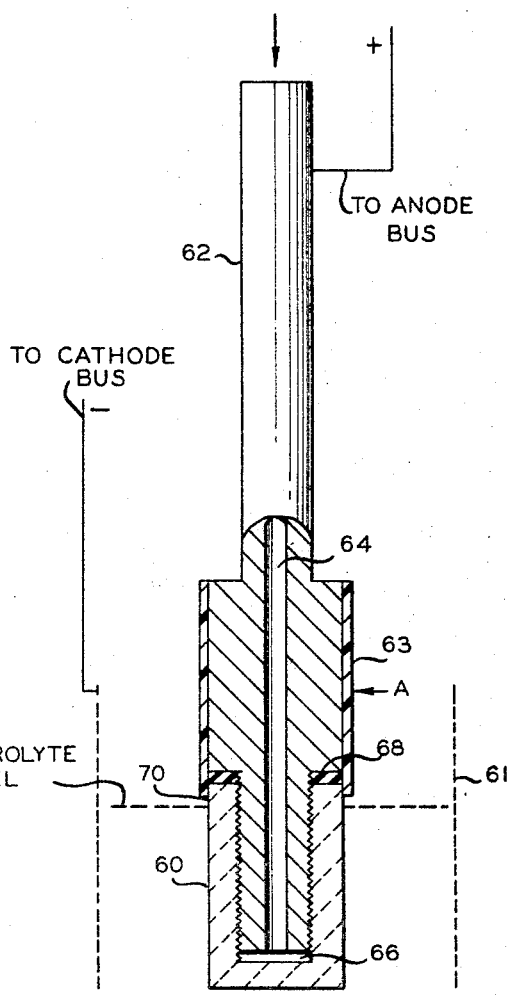
FIGURE 3 is a view in cross section illustrating another form of anode assembly which can be employed in the practice of the invention.

The anode assembly illustrated in FIGURE 3 comprises porous carbon cylinder 60 which is threaded onto the lower portion of anode support and current collector 62 by means of the threads shown. Passageway 64 provides means for introduction of the feedstock to the small space 66 provided at the bottom of the anode. The top of said carbon cylinder 60 is sealed by means of gasket 68. Plastic tape 63 (Teflon) is provided to protect anode support 62. The bottom surface of the anode is preferably coated with a resistant cement to restrict the exposed surface to the vertical portion only. In use, this anode can be disposed in the electrolyte with an exposed portion 70 above the surface of the electrolyte level as shown in the drawing. When so disposed it is possible to operate the anode in accordance with the preferred method of the invention by maintaining the flow of feedstock within the pores of the anode. In this operation the feedstock enters the pores of the carbon at the bottom of the cylinder, flows vertically via interconnecting pores, and exits from the carbon at 70 directly into the space above the surface of the electrolyte within the anode compartment. The anode assembly can also be disposed so that the entire carbon portion is immersed, e.g., to the point A indicated in the drawing. When so disposed the anode can be operated in a manner, e.g., higher flow rates, to introduce the feedstock into and through the pores of the anode into contact with the main body of the electrolyte in accordance with a less preferred embodiment of the invention, if desired.

While the cell in FIGURE 1 has been illustrated as being substantially cylindrical in shape, any other suitable configuration can be employed, e.g., any other suitable electrolysis cell incorporating the general features of said cell of FIGURE 1. It is also within the scope of the invention to employ anodes having a configuration other than cylindrical, e.g., rectangular, or triangular, and a disposition within the cell other than vertical, e.g., horizontal.

The following examples will serve to further illustrate the invention.

Example I

The oxygen in a stream of air was electrolytically converted to oxygen difluoride in a cell substantially like that illustrated in FIGURE 1 and which utilized a porous carbon anode and a nickel cathode. The cathode was in the form of a circular 8-mesh screen which surrounded the anode. The anode was a hollow porous carbon cylinder 16 with one end closed and the open end communicating via conduit 18 with a controlled stream of compressed air. The nickel screen 17 was omitted. The porous carbon (Stackpole Grade 139) had a pore volume of about 0.2 cm.$^3$/g. with pore diameters ranging from about 0.1 to about 10 microns. The air was passed into the pores of said carbon cylinder at substantially atmospheric pressure and into the cell at a flow rate of 100 cc./min. The cell was maintained at 86° C. and contained a mixture of essentially anhydrous hydrogen fluoride and potassium fluoride which approximated the formula 2HF·KF. A divider, fashioned from 8-mesh Monel screen coated with polytetrafluorethylene, was used in the cell to divide the cell into an anode compartment and a cathode compartment, thus separating the by-product hydrogen from the product oxygen difluoride stream. The carbon anode had a geometric surface area of about 30 cm.$^2$.

The electrolysis was carried out with a current density of 100 milliamps per square centimeter of anode geometric surface and a voltage of about 7 volts. The effectiveness of the process was measured by passing the anode product gases into a KI solution for a measured time and the iodine formed was titrated with freshly prepared standard thiosulfate. The conversion of oxygen to oxygen difluoride was found to be about 40 percent and the current efficiency was found to be about 78 percent of theoretical. There was no evidence of free fluorine in the effluent gases and gas-liquid chromatography showed only oxygen and nitrogen in the anode product stream after the KI treatment, thus showing that except for the oxygen-depleted air (and hydrogen produced at the cathode), the oxygen difluoride was the only product of the process.

Example II

Two series of runs were carried out to demonstrate entry of the feedstock into the pores of a porous anode and the flow of said feedstock within said pores in accordance with the preferred method of the invention.

In these runs an anode assembly essentially like that illustrated in FIGURE 2 was employed. Said anode assembly was employed in a cell arrangement substantially like that illustrated in FIGURE 1 except that the cell container was provided with a window for observation of the anode. Said anode assembly comprised a porous carbon cylinder 40 having a side wall thickness of about 0.635 centimeter and an outside vertical surface area of 30 square centimeters. The carbon cylinder has an outside diameter of 1 inch and a height of 1.5 inches. A feed tube 42 extended through a metal plug 44 attached to the lower end of said feed tube 42. Said metal plug 44 was sized to have a press fit with the lower inner circumference of said carbon cylinder, as illustrated. In assembly of the anode, said feed tube and metal plug are first inserted into the carbon cylinder. Said carbon cylinder is then threaded onto the reduced diameter portion 46 of the anode support and current collector 48, by means of the threads shown. The upper end of the carbon cylinder 40 fits against gasket or seal material 50. A Teflon tape seal material 52 coats the lower portion of said metal current collector 48. An annular space 54 is provided around said feed tube 42 within said anode support and current collector 48. Anode inner vent 56 extends from the upper inner surface of anode 40 and into communication with said annular space 54. Said inner vent 56 provides a collection zone for unreacted feedstock and fluorinated products exiting from the pores of the anode. Exit vent 58, in communication with said annular space 54 and said inner vent 56, is provided in the upper portion of said anode support and current collector 48 for withdrawing fluorinated feedstock and any remaining unfluorinated feedstock as anode products. Said anode products can thus be collected separately from the cathode products if so desired. Cap 60 is provided for closing said exit vent as indicated by the dotted lines.

In one series of runs the porous carbon anode 40 was made of National Carbon Company Grade 45 carbon (NC–45) having a pore volume of about 0.5 cc. per gram with pore diameters ranging from 10 to 100 microns. The average pore diameter was about 58 microns. The anode assembly was positioned in a hydrogen fluoride electrolyte, essentially like that described in Example I, and immersed to the point indicated by the electrolyte level line in FIGURE 2. With cap 60 in place, ethylene feed was started flowing into the anode through feed tube 42 at a rate of 10 liters per hour. The only place bubbles formed was in the top potrion of the anode immediately adjacent seal 50, i.e., within the upper 0.25 inch of the anode. This demonstrates that the ethylene had entered the pores of the carbon anode near the bottom thereof and had flowed vertically through the inner connecting pores of the anode without escaping therefrom except at the top as described. The flow rate of ethylene was gradually increased to 60 liters per hour. At 60 liters per hour there was some breakout of feed at points lower than the upper 0.25 inch of the anode but still well within the upper portion of the anode. When the increased flow rate had reached 90 liters per hour, some bubble formation (breakout) was noted toward the bottom portion of the anode. However, it was observed that substantially all of the ethylene continued to flow up through the anode and exit therefrom in the top portion of the anode. When cap 60 was removed there was no breakout from the surface of the anode, even at the 90 liter per hour flow rate.

In another series of runs the porous carbon anode was fabricated from the above-described Stackpole 139 carbon having a pore volume of about 0.2 to 0.3 cc. per gram with the pore diameters ranging from 0.1 to 10 microns. These runs were made with cap 60 removed. Flow of ethylene was started at 2 liters per hour. No bubble formation outside the upper 0.25 inch portion of the anode was observed until the flow rate had reached 40 litetrs per hour. This run shows that the less permeable Stackpole 139 carbon will not permit as high a flow rate of gas through its pores as will the more permeable NC–45 carbon.

Another series of runs was made using the Stackpole 139 carbon anode with the cap 60 in place closing exit 58. At flow rates of 2 liters per hour essentially all of the breakout or bubble formation on the outer surface of the anode was within the upper 0.25 inch of the anode.

At flow rates of 10 liters per hour there was some breakout (bubble formation) outside the upper 0.25 inch portion of the anode, but substantially all of the breakout was still in the upper 0.25 inch portion of the anode. At flow rates of 40 liters per hour the proportion of breakout outside the upper 0.25 inch portion of the anode increased, but the major portion of the gas was still exiting from the upper portion of the anode. These runs show that even with the less permeable Stackpole 139 carbon, the feed enters the anode near the bottom and flows up through the connecting pores and escapes from the upper portion of the anode.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for producing oxygen difluoride, which process comprises: passing an electric current through a current-conducting essentially anhydrous liquid hydrogen fluoride electrolyte contained in an electrolysis cell provided with a cathode and a porous anode; passing a feedstock comprising an oxygen-containing gas into the pores of said anode; and recovering oxygen difluoride from an effluent stream from said cell as a product of said process.

2. A process according to claim 1 wherein: said anode is porous carbon; and said feedstock is passed into the pores of said anode at a rate within the range of from 0.002 to 0.3 mole of oxygen per hour per square centimeter of anode geometric surface area.

3. A process according to claim 2 wherein said anode has a pore volume within the range of from about 0.2 to about 0.5 cc. per gram with the pores ranging from 0.1 to 60 microns in diameter.

4. A process according to claim 2 wherein said feedstock is air; and said feed rate and the flow of said electric current are correlated so that the amount of electric current passed through said electrolyte is from 0.2 to 4 Faradays per mole of said oxygen.

5. A process according to claim 1 wherein said anode is porous carbon; and said feedstock is passed into the pores of said anode, and therein into contact with a fluorinating species produced by said electrolysis, at a flow rate such that the inlet pressure of said feedstock into said pores is less than the sum of (a) the hydrostatic pressure of said electrolyte at the level of entry of said feedstock into said pores and (b) the exit pressure of any unreacted feedstock and fluorinated products from said pores into said electrolyte.

6. A process according to claim 5 wherein said fluorinated product and any remaining unfluorinated feedstock are passed from within said pores of said anode directly into a space above said electrolyte within said cell.

7. A process according to claim 5 wherein said fluorinated product and any remaining unfluorinated feedstock are passed from within said pores of said anode directly into a collection zone which is at least partially within the confines of said anode.

8. A process according to claim 5 wherein: said feedstock is essentially pure oxygen; said electrolyte contains a conductivity additive selected from the group consisting of ammonium fluoride and the alkali metal fluorides, said additive being present in a molar ratio of additive to hydrogen fluoride within the range of from 1:4.5 to 1:1; and said electric current is passed through said cell at a cell voltage within the range of from 4 to 20 volts and in an amount which is sufficient to provide a current density within the range of from 30 to 1000 milliamps per square centimeter of anode geometric surface.

9. A process according to claim 5 wherein said flow rate is within the range of from 3 to 600 milliliters per minute per square centimeter of anode cross-sectional area.

10. A process according to claim 9 wherein the pores of said anode have a permeability within the range of from 0.5 to 75 darcys and an average pore diameter within the range of from about 20 to about 75 microns.

References Cited

UNITED STATES PATENTS

| | | | |
|---|---|---|---|
| 2,519,983 | 8/1950 | Simons | 204—59 |
| 2,717,871 | 9/1955 | Scholberg et al. | 204—59 |

FOREIGN PATENTS 741,399  11/1955  Great Britain.

HOWARD S. WILLIAMS, Primary Examiner